United States Patent Office 3,202,702
Patented Aug. 24, 1965

3,202,702
SYNTHESIS OF BETA-OXY SUBSTITUTED
ALKANOIC ACIDS
Kenneth L. Olivier, Placentia, Calif., assignor to Union
Oil Company of California, Los Angeles, Calif., a corporation of California
No Drawing. Filed June 10, 1963, Ser. No. 286,468
6 Claims. (Cl. 260—494)

This invention relates to the preparation of various alkanoic acids including acyloxy alkanoic and beta hydroxy-alkanoic acids and to their pyrolytic decomposition to yield acrylic and alpha-alkyl acrylic acids.

The process of this invention comprises the reaction of formaldehyde with metal carboxylate salts in liquid phase and in the presence of a base to yield an oxy, i.e., hydroxy or acyloxy substituted alkanoic acid. The reaction can be performed in liquid alkanoic acids and thereby yield a beta acyloxy alkanoic acid. The invention can also be performed where the reactants comprise the entire reaction medium or where an inert organic reaction medium is used to yield the beta hydroxy alkanoic acid.

Additionally, the invention also comprises the subsequent conversion by pyrolytic decomposition of the beta oxy, i.e., beta hydroxy or beta acyloxy alkanoic acid to yield acrylic and alpha alkyl acrylic acids.

In the preferred embodiment, the invention comprises the reaction of formaldehyde with lead acetate in an acetic acid medium to yield beta acetoxy propionic acid which can be recovered as a product or which, preferably, can be heated to eliminate acetic acid and form acrylic acid. The reaction is performed at temperatures between about 100° and about 300° C., sufficient pressure to maintain liquid phase conditions, generally between about 1 and about 50 atmospheres and sufficient time to complete the reaction, generally between about 0.25 and about 4 hours.

The preferred reaction solvents comprise the alkanoic acids, particularly acetic, propionic, butyric and valeric acids. Other organic liquids that are inert to the reaction can, of course, be employed including any of the following: halogenated hydrocarbons such as methylene chloride, chloroform, carbon tetrachloride, dichloropropane, chlorobenzene, bromobenzene, orthodichlorobenzene, etc.; hydrocarbons such as pentane, hexane, benzene, heptane, toluene, octane, xylene, nonane, etc.; and ethers such as diisopropyl ether, propylene glycol dimethyl ether, ethyleneglycol diethyl ether (diethyl Cellosolve), dibutyl ether, monomethyl glycolacetate (methyl-Cellosolve acetate), methyl orthotolyl ether, diisoamyl ether, methyl paratolyl ether, methyl metatolyl ether, etc.; and miscellaneous solvents such as nitrobenzene, gamma butyrolactone, tetramethylene sulfone, formamide, N,N-dimethyl formamide, N,N-dimethyl acetamide, N-methyl pyrolidone, etc.

The reaction involves the condensation of formaldehyde with the carboxylic salt of a heavy metal selected from the class consisting of tin, antimony, bismuth and lead. Preferably, lead salts are employed. In general, the salts of alkanoic acids are employed such as the salts of acetic, propionic, butyric and valeric acids. Of these, the acetates, particularly lead acetate salts, are preferred. Preferably, the reaction solvent employed is the carboxylic acid corresponding to the carboxylate ion of the particular metal salt employed. As previously mentioned, this embodiment of the invention leads to the formation of the acyloxy alkanoic acid. Thus, the various preferred combinations are lead acetate in acetic acid, lead propionate in propionic acid, lead butyrate in butyric acid and lead valerate in valeric acid.

In another embodiment of the invention, any of the aforementioned inert organic solvents can be employed to yield the beta hydroxy alkanoic acid rather than the esterified product obtained when employing carboxylic acids as the reaction medium. Thus, lead acetate can be employed in solvents such as dichloropropane, chlorobenzene, pentane, xylene, etc. to obtain yields of beta hydroxypropionic acid.

The products from the condensation depend, of course, upon the identity of the carboxylate anion of the heavy metal salt. Thus when condensing formaldehyde with metal carboxylates in an inert organic medium the following are obtained: beta hydroxymethyl acetic acid from acetate salts, beta hydroxymethylpropionic acid from propionates, beta hydroxymethylbutyric acid from butyrates and beta hydroxymethylvaleric acid from valerates. The formation of any of the aforementioned hydroxy acids in the preferred alkanoic acid solvent will of course result in esterification to yield the acyloxy derivatives. Thus, when the alkanoic acid corresponding to the carboxylate anion of the heavy metal salt is employed the following products are obtained; beta acetoxymethyl acetic acid from acetate salts, beta propionoxymethyl propionic acid from propionates, beta butyroxymethyl butyric acid from butyrates, and beta valeroxymethyl valeric acid from valerates.

Subsequent pyrolysis of the beta hydroxyalkanoic acids yields respectively, acrylic, methacrylic, alphaethyl acrylic and alphapropyl acrylic acids. If desired, this pyrolysis can be performed in the presence of known dehydration catalysts or promoters such as phosporic acid, silica, etc. Subsequent pyrolysis of the beta acetoxyalkanoic acids yields the same respective products, however, this embodiment results in liberation of the alkanoic acid of the acyl radical while the former pyrolysis liberates water.

The aldehyde condensation is performed in the presence of a basic material that serves to initiate the reaction period. In general, between about 1 and 20 weight percent; preferably between about 3 and 15 weight percent of a base is used. Various bases can be employed to lower the pH of the reaction solvent including alkali metal and ammonium carboxylates, e.g., sodium acetate, lithium butyrate, cesium propionate, potassium valerate, ammonium acetate, etc. Various heterocyclic amines can also be employed including pyridine, quinoline, isoquinoline, alpha picoline, beta picoline, gamma picoline, lutidines, collidine, alkyl and polyalkyl quinolines, e.g., methyl quinoline, ethyl quinoline, dimethyl quinoline, etc., and isoquinolines, etc. Of the aforementioned, the alkali metal carboxylates and pyridine are the preferred bases.

In general, the reaction is conducted at temperatures between about 100° and about 300° C.; between about 150° and about 250° C. are preferred. Sufficient pressure is maintained on the reactants to maintain liquid phase conditions at the reaction temperatures, generally between about 1 and about 50 atmospheres; preferably between about 5 and about 20 atmospheres are employed. The beta acyloxyalkanoic acid or beta hydroxyalkanoic acid readily forms under these conditions within between about 0.5 and about 4 hours and the course of the reaction can be followed by various methods apparent to those skilled in the art, e.g., determining the rate of disappearance of formaldehyde by periodically withdrawing aliquot portions of the reaction mixture and determining the amount of unreacted formaldehyde present with standard analytical techniques such as reaction with sodium bisulfite, etc.

The crude product from the reaction comprises the lead salt of the beta hydroxyalkanoic acid in the inert organic solvent or the lead salt of the beta acyloxyalkanoic acid in the alkanoic acid solvent. The hydroxyalkanoic or acyloxyalkanoic acid can be freed from their lead salt by suitable means, e.g., treatment of the salt with an excess of the alkanoic acid solvent to liberate the beta acyloxyalkanoic acid followed by separation of the latter by suitable means, e.g., distillation, crystallization, filtration, etc. from the reaction solvent. This embodiment, of course, results in esterification of the beta hydroxyalkanoic acid. If desired, a strong mineral acid such as sulfuric, hydrochloric, phosphoric, etc., can be added in lieu of a carboxylic acid to precipitate the inorganic lead salt and form the beta hydroxyalkanoic acid which can be recovered by extraction with a solvent such as ether, e.g., diethyl ether, diisopropyl ether, etc. When the inert organic reaction medium is used, the lead inorganic salt can be separated by conventional solid-liquid separation, e.g., filtration and the resulting beta hydroxyalkanoic acid recovered from the solvent by distillation or crystallization as apparent to those skilled in the art.

When an excess of alkanoic acid is used as a solvent, it is, of course, apparent that the acyloxyalkanoic acid is liberated from the lead salt in situ and thus no separate step is required to free this material from the lead salt. Rather, the aforementioned separation techniques, distillation, crystallization, filtration, etc., can be used directly on the crude reaction mixture to separate the beta acyloxyalkanoic acid product.

The unsaturated acid, i.e., acrylic or its homolog, can be obtained from the recovered beta acyloxyalkanoic acid by heating the latter to a temperature between about 100° and about 250° C., sufficient to eliminate the acyloxy radical and a proton from the beta acyloxyalkanoic acid, thereby forming the alkanoic acid of the acyloxy radical and acrylic acid or its homolog. Subsequent distillation will readily separate the liberated alkanoic acid and acrylic acid or its homolog.

My invention will now be illustrated by the following examples:

Example 1

A beta hydroxyalkanoic acid was prepared by charging 15 grams of paraformaldehyde, 114 grams of lead acetate trihydrate, 5 milliliters of pyridine and about ½ gram of hydroquinone to a 300 milliliter pressure bomb. The bomb was closed, purged of air with nitrogen and then heated to 175° C. and held at that temperature for 2 hours. At the end of said period, the bomb was cooled to room temperature. The bomb was depressured and the product comprising a black liquid was removed and acidfied with excess hydrochloric acid to yield a white-brown lead chloride precipitate and a red solution. The solid was removed by filtration and the liquid was extracted with ether. The ether extract was dried and distilled at atmospheric pressure to yield a clear colorless liquid identified by subsequent analysis to be beta hydroxypropionic acid.

Example 2

To a half-gallon autoclave were charged 60 grams of formaldehyde, 10 grams of pyridine, 70 grams of lead acetate and 500 grams of acetic acid with about 1 gram of hydroquinone. The mixture was purged of air with nitrogen and heated to 175° C. under a nitrogen pressure of 400 p.s.i.g. After 3 hours at this temperature, the autoclave was cooled and the crude product removed. The crude product comprised a dark liquid that was distilled at atmospheric pressure to remove the solvent. The residue was then distilled under vacuum to give 20 grams of a light yellow liquid found upon analysis to comprise beta acetoxypropionic acid.

Example 3

The beta acetoxypropionic acid reported in Example 2 is added gradually to a glass tube packed with glass beads and heated to about 200° C. A stream of nitrogen is used to sweep the pyrolysis products into a cooled receiver. Vacuum distillation of the product gives acetic acid, acrylic acid and some unconverted beta acetoxypropionic acid. The latter is recycled to recover additional quantities of acrylic acid.

The preceding examples are intended solely to illustrate a mode of practicing my invention and are not to be construed as unduly limiting thereof. My invention is intended to be defined by the following method steps and their equivalents set forth in the following claims.

I claim:

1. The preparation of a beta oxy substituted alkanoic acid that comprises condensing formaldehyde with a heavy metal salt of an alkanoic acid, said heavy metal selected from the class consisting of lead, bismuth, antimony and tin; said condensation being performed at temperatures between about 100° and about 300° C., sufficient pressure to maintain liquid phase conditions and in the presence of a base selected from the class consisting of alkali metal and ammonium carboxylates, and heterocyclic amines selected from the class consisting of pyridine, quinoline and isoquinoline and lower alkyl substituted pyridine, quinoline and isoquinoline.

2. The method of claim 1 wherein said heavy metal salt is lead acetate and said acid is beta hydroxypropionic acid.

3. The preparation of a beta hydroxyalkanoic acid that comprises condensing formaldehyde with a lead salt of an alkanoic acid having 2 to about 5 carbon atoms at a temperature between about 100° and 300° C., a pressure between about 1 and about 50 atmospheres sufficient to maintain liquid phase conditions, a period of time between about 0.5 and about 4 hours to complete said condensation and in the presence of a base selected from the class consisting of alkali metal and ammonium carboxylates, and heterocyclic amines selected from the class consisting of pyridine, quinoline and isoquinoline and lower alkyl substituted pyridine, quinoline and isoquinoline.

4. The preparation of a beta acyloxyalkanoic acid that comprises condensing formaldehyde with the heavy metal salt of an alkanoic acid having between 2 and about 5 carbon atoms, said heavy metal being selected from the class consisting of lead, bismuth, antimony and tin, in a reaction medium comprising an alkanoic acid corresponding to the carboxylate anion of said heavy metal salt at a temperature between about 100° and about 300° C., about 1 and about 50 atmospheres pressure, sufficient to maintain said reaction solvent in liquid phase, a period between about 0.5 and about 4 hours, sufficient to complete said condensation and in the presence of a base selected from the class consisting of alkali metal and ammonium carboxylates, and heterocyclic amines selected from the class consisting of pyridine, quinoline and isoquinoline and lower alkyl substituted pyridine, quinoline and isoquinoline.

5. The preparation of claim 4 wherein said heavy metal salt is a lead salt.

6. The preparation of beta acetoxypropionic acid that comprises using lead acetate in an acetic acid reaction medium in the preparation of claim 5.

References Cited by the Examiner

UNITED STATES PATENTS 2,226,645  12/40  Thomas _____ 260—535 X

LORRAINE A. WEINBERGER, *Primary Examiner.*

LEON ZITVER, *Examiner.*